United States Patent
Cho et al.

(10) Patent No.: US 8,811,984 B2
(45) Date of Patent: Aug. 19, 2014

(54) AREA-BASED ACCESS CONTROL METHOD FOR TERMINALS WHICH CARRY OUT M2M COMMUNICATIONS IN A WIRELESS COMMUNICATION SYSTEM

(75) Inventors: Song-Yean Cho, Seoul (KR); Sung-Ho Choi, Suwon-si (KR); Beom-Sik Bae, Suwon-si (KR); Kyeong-In Jeong, Hwaseong-si (KR); Chae-Gwon Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 31 days.

(21) Appl. No.: 13/499,541

(22) PCT Filed: Oct. 5, 2010

(86) PCT No.: PCT/KR2010/006779
§ 371 (c)(1),
(2), (4) Date: Apr. 17, 2012

(87) PCT Pub. No.: WO2011/043571
PCT Pub. Date: Apr. 14, 2011

(65) Prior Publication Data
US 2012/0196599 A1   Aug. 2, 2012

(30) Foreign Application Priority Data
Oct. 5, 2009  (KR) .................. 10-2009-0094227

(51) Int. Cl.
*H04W 4/00* (2009.01)
(52) U.S. Cl.
USPC ..................................... 455/434; 455/435.1

(58) Field of Classification Search
CPC ..... H04W 48/16; H04W 60/00; H04W 36/14; H04W 48/02; H04W 84/045; H04W 8/06; H04W 8/065; H04W 8/12; H04W 8/16; H04L 12/5865; H04L 12/66; H04M 2207/18
USPC ............................... 455/435.1, 436–444, 434
See application file for complete search history.

(56) References Cited

U.S. PATENT DOCUMENTS

| | | | |
|---|---|---|---|
| 2004/0147255 A1 | 7/2004 | Lee | |
| 2004/0203775 A1* | 10/2004 | Bourdeaut et al. | 455/435.1 |
| 2004/0224682 A1* | 11/2004 | Kang | 455/433 |
| 2008/0064411 A1 | 3/2008 | Kim | |

(Continued)

OTHER PUBLICATIONS

PCT/ISA/237 Written Opinion issued on PCT/KR2010/006779 (pp. 4).

(Continued)

*Primary Examiner* — Olumide T Ajibade Akonai
*Assistant Examiner* — Edward Zhang
(74) *Attorney, Agent, or Firm* — The Farrell Law Firm, P.C.

(57) ABSTRACT

A regional access control method is provided in a Mobility Management Entity (MME) for network access for a User Equipment (UE) that performs Machine-to-Machine (M2M) communication. An access request message and location information of the UE are received from a base station. The access request message is transmitted to the MME in response to reception of the access request message at the base station from the UE. A location of the UE that is determined based on the location information of the UE, is registered in a Home Subscriber Server (HSS). An allowed list of the UE is obtained from the HSS. It is determined whether the location information of the UE is registered in the allowed list.

26 Claims, 7 Drawing Sheets

(56) References Cited

U.S. PATENT DOCUMENTS

| | | |
|---|---|---|
| 2008/0153521 A1 | 6/2008 | Benaouda et al. |
| 2009/0129342 A1* | 5/2009 | Hwang et al. ............ 370/331 |
| 2009/0196265 A1* | 8/2009 | Mariblanca Nieves et al. ............ 370/338 |
| 2009/0305699 A1* | 12/2009 | Deshpande et al. ......... 455/434 |
| 2010/0075635 A1* | 3/2010 | Lim et al. ............ 455/411 |
| 2010/0075698 A1* | 3/2010 | Rune et al. ............ 455/458 |
| 2010/0265867 A1* | 10/2010 | Becker et al. ............ 370/312 |
| 2011/0183675 A1* | 7/2011 | Bae et al. ............ 455/436 |

OTHER PUBLICATIONS

PCT/ISA/210 Search Report issued on PCT/KR2010/006779 (pp. 3).

* cited by examiner

AREA-BASED ACCESS CONTROL METHOD FOR TERMINALS WHICH CARRY OUT M2M COMMUNICATIONS IN A WIRELESS COMMUNICATION SYSTEM

PRIORITY

This application is a National Phase Entry of PCT International Application No. PCT/KR2010/006779, which was filed on Oct. 5, 2010, and claims priority to a Korean Patent Application filed in the Korean Intellectual Property Office on Oct. 5, 2009 and assigned Serial No. 10-2009-0094227, the entire disclosures of which are incorporated herein by reference.

BACKGROUND OF THE INVENTION

1. Field of the Invention

The present invention relates generally to a regional access control method for User Equipments (UEs) in a wireless communication system, and more particularly, to a regional access control method for immobile UEs that perform Machine-to-Machine (M2M) communication.

2. Description of the Related Art

In general, M2M communication refers to communication between electronic devices. In a grander scheme, M2M communication includes wired or wireless communication between electronic devices, and communication between a device and a machine controlled by a person. Recently, M2M communication has been used to indicate communication between electronic devices, specifically, wireless communication between devices. M2M communication may also be referred to as machine type communication.

In the early 1990s, when M2M communication was first introduced, M2M communication was merely understood as a technology associated with remote control or telematics, and the market derived from this technology was significantly limited. However, M2M communication has developed significantly over the past few years, and has drawn attention from the global market, in addition to the Korean market. M2M technology can be utilized for various purposes, in conjunction with conventional mobile communication technology, wireless high-speed Internet technology, and low-power wireless communication solutions, such as, for example, Wireless Fidelity (Wi-Fi), ZigBee, and the like. The main application fields of M2M technology may include vehicle telematics, logistics management, intelligent meter reading systems, remote asset management systems, sales management systems, such as a Point Of Service (POS) system, and security fields.

Research on M2M technology in conjunction with a mobile communication system has been actively conducted. Although a conventional mobile communication system considers mobility of a terminal as an important issue, M2M communication may use terminals that are nearly immobile and are used in a predetermined location. Accordingly, the mobile communication system may only need a simple mobility management method for the nearly immobile terminals.

To reduce network management costs through use of the simple mobility management method, a new regional access control method is needed for a terminal. A conventional method for controlling network access for a terminal based on a region may use an attach accept message, a Tracking Area Update (TAU) accept message, and a handover restriction list included in a handover request message.

When the method is applied to M2M communication, information associated with all regions excluding an allowed region, such as a tracking area or cell, may need to be added to a restriction list, so as to enable an immobile terminal to access a network within a predetermined region. Accordingly, it may be considered inconvenient for a terminal that is nearly immobile to add most regions in the restriction list.

SUMMARY OF THE INVENTION

The present invention has been made to address at least the above problems and/or disadvantages and to provide at least the advantages described below. Accordingly, an aspect of the present invention provides a regional access control method that controls network access for a UE that performs M2M communication.

Another aspect of the present invention provides a dynamic regional access control method for a non-representative UE through the use of the concepts of a representative UE and a group.

In accordance with an aspect of the present invention, a regional access control method is provided in a Mobility Management Entity (MME) for network access for a UE that performs M2M communication. An access request message and location information of the UE are received from a base station. The access request message is transmitted to the MME in response to reception of the access request message at the base station from the UE. A location of the UE that is determined based on the location information of the UE, is registered in a Home Subscriber Server (HSS). An allowed list of the UE is obtained from the HSS. It is determined whether the location information of the UE is registered in the allowed list.

In accordance with another aspect of the present invention, a regional access control method is provided in an MME for network access for a UE that performs M2M communication. An access request message and location information of the UE are received from a base station. The access request message is transmitted to the MME in response to reception of the access request message at the base station from the UE. A location of the UE that is determined based on the location information of the UE, is registered in an HSS. An allowed list of the UE and information associated with a representative UE are obtained from the HSS. It is determined whether the location information of the UE is registered in the allowed list. The allowed list stored in the HSS is updated based on the information associated with the representative UE when the location information of the UE is absent from the allowed list. In accordance with still another aspect of the present invention, a regional access control method is provided in a MME for TAU by a UE that performs M2M communication. An access request message and location information of the UE are received from a base station. The access request message is transmitted to the MME in response to reception of a TAU request message at the base station from the UE. It is determined whether the location information of the UE is included in an allowed list. The allowed list stored in an HSS is updated based on information associated with a representative UE when the location information of the UE is absent from the allowed list.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Figure 1:
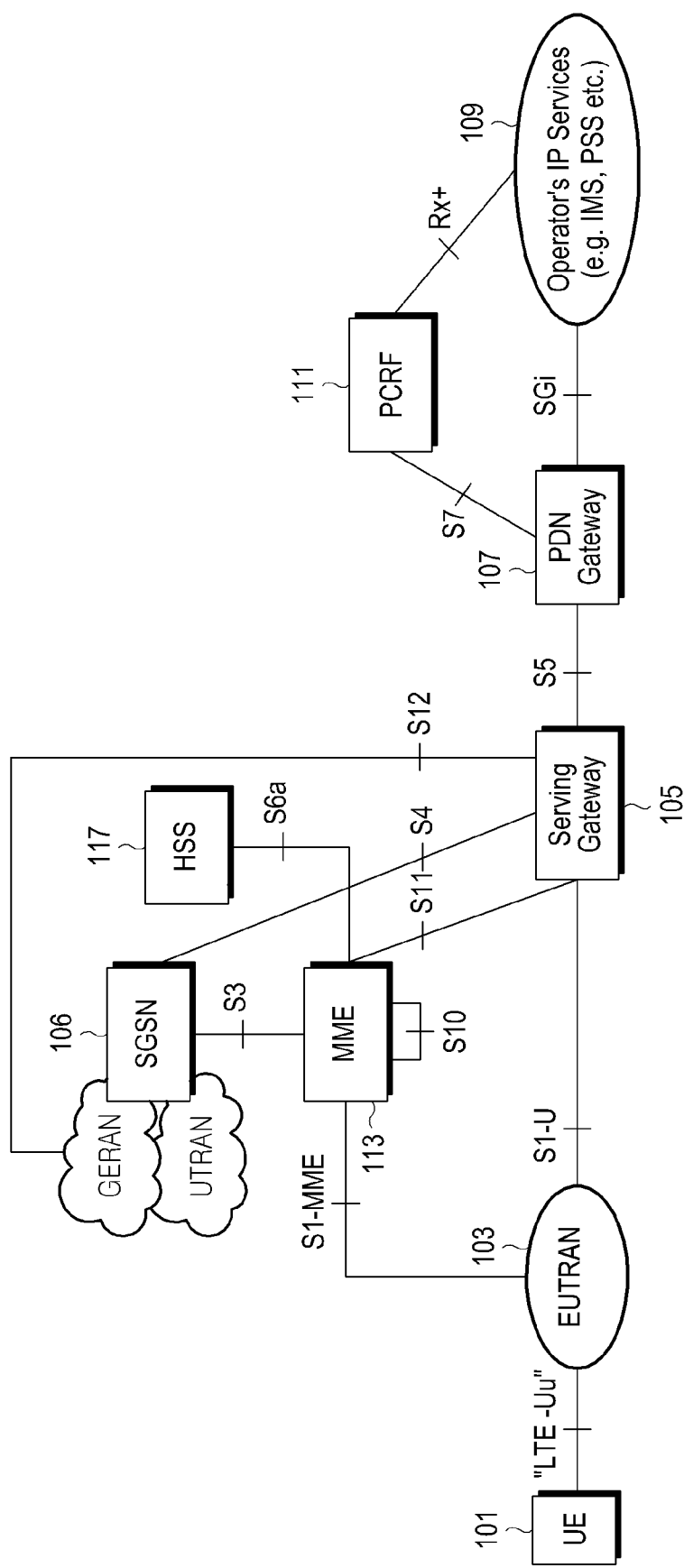
FIG. 1 is a diagram illustrating a System Architecture Evolution (SAE) corresponding to an enhanced packet system developed by the 3rd Generation Partnership Project (3GPP)

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Embodiments of the present invention propose a regional access control method for (UEs), which are nearly immobile, and which perform M2M communication or machine type communication in a wireless communication system. The above-described UEs may be referred to as a limited-mobility UE hereinafter. The regional access control method may use an allowed list, which is the opposite of a restriction list that manages regions to which a UE is not allowed to move. Hereinafter, embodiments of the present invention are described based on a 3GPP system. However, embodiments of the present invention are not limited to the 3GPP system.

The embodiments of the present invention may provide a dynamic regional access control method based on the concepts of a representative UE and a group and thus, a user may not need to manually update an allowed list.

The embodiment of the present invention may simplify mobility management for UEs that are nearly immobile from among UEs that perform M2M communication and thus, network management costs may be reduced.

The embodiments of the present invention may control an access to a network based on a region and thus, may prevent a lost UE, which is used only in a predetermined place, for example a home appliance or a surveillance camera, from being utilized by a non-owner.

FIG. 1 illustrates an SAE corresponding to an enhanced packet system developed by 3GPP.

The SAE includes a UE 101, an Enhanced Universal Terrestrial Radio Access Network (E-UTRAN) 103, an MME 113, a Serving GateWay (SGW) 105, a Packet or Public Data Network (PDN) GateWay (PGW) 107, a serving General Packet Radio Service (GPRS) Support Node (SGSN) 106, an HSS 117, and a Policy Control and Charging Rules Function (PCRF) 111.

The E-UTRAN 103 may correspond to an enhanced access network, and may include an enhanced Node B (eNB) as an E-UTRAN entity. The MME 113 may perform functions of Non-Access Stratum (NAS) signaling, NAS signaling security, mobility management between 3GPP networks, management of location of an idle mode UE, roaming, authentication, management of a bearer, and the like.

The SGW 105 may perform mobility management between eNBs and mobility management between 3GPP networks, and may manage E-UTRAN idle mode downlink packet buffing, lawful interception, packet routing and forwarding, and the like. The PGW 107 may perform functions of policy enforcement, per-user based packet filtering, charging support, lawful interception, UE Internet Protocol (IP) allocation, packet screening, and the like.

The PCRF 111 may manage a policy to be applied to a UE, Quality of Service (QoS), and the like. The SGSN 106 may correspond to an entity associated with a legacy packet network such as GPRS network. The HSS 117 may manage subscriber information and location information of a user. It is apparent to those skilled in the art that the entities described in the foregoing may have additional functions.

Embodiments of the present invention may provide a static regional access control method and a dynamic regional access control method, through the use of an allowed list. The allowed list may include at least one of a global cell identity list, an E-UTRAN Cell Global Identity (ECGI) list and a Tracking Area Identity (TAI) list, corresponding to location information of a limited-mobility UE. Although embodiments of the present invention use an ECGI and a TAI as the location information of the limited-mobility UE, it is apparent to those skilled in the field that the ECGI or TAI may be used.

Hereinafter, two access control methods are described with reference to corresponding drawings.

Figure 2:
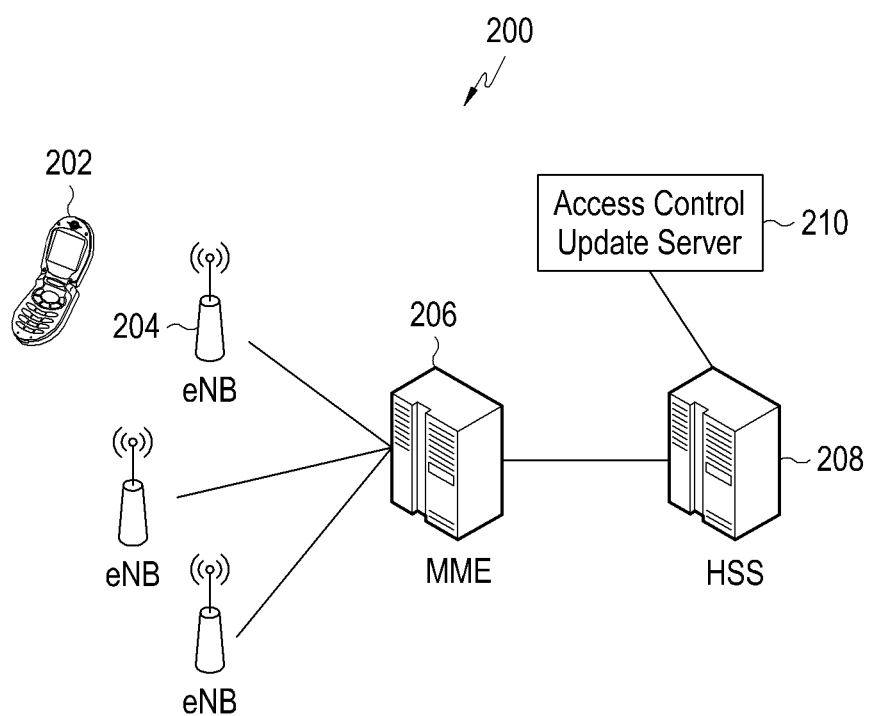
FIG. 2 is a diagram illustrating a configuration of a system that performs static regional access control, according to an embodiment of the present invention.

FIG. 2 illustrates a configuration of a system 200 that performs static regional access control, according to an embodiment of the present invention Referring to FIG. 2, the system 200 includes a UE 202, an eNB 204, an MME 206, and an HSS 208. The HSS 208 includes an access control update server 210. A description of remaining elements included in the system 200, which are not associated with embodiments of the present invention, is omitted.

The UE 202 may perform M2M communication or machine type communication. In particular, the UE 202 is assumed to be a limited-mobility UE. For example, the UE 202 may be, for example, a home appliance, a surveillance camera, a vending machine or a display device installed in a building.

When the UE 202 is turned 'off' and moves to a new region, the UE 202 may need to access a network to be turned 'on' in the new region. Accordingly, the HSS 208 may include an allowed list that includes information associated with a region in which the UE 202 is allowed to access the network.

When the UE 202 requests access to the network after moving to the new region, the HSS 208 may transmit, to the MME 206, the allowed list along with subscriber information of the UE 202. The MME 206 may determine whether location information, associated with an access-requesting region where the UE 202 requests access to the network, is included in the allowed list received by the HSS 208. When the access-requesting region of the UE 202 is included in the allowed list, the MME 206 may allow the UE 202 to access the network. When the access-requesting region of the UE 202 is absent in the allowed list, the MME 206 may reject the request for access.

When the UE 202 moves to a region that is not set in the allowed list, the UE 202 may need to add location information associated with the desired region to the allowed list by performing access in a region included in the allowed list. The UE 202 may set a bearer, and may access the network through use of the set bearer. Subsequently, the UE 202 may access the access control update server 210 included in the HSS 208 so as to request updating the allowed list. Upon updating the allowed list, the UE 202 may be able to move to the desired region.

A static regional access control method may be classified into two approaches based on a scheme of accessing the access control update server 210 and updating an allowed list. One approach is a static regional access control method performed when a UE updating an allowed list is the same as a UE that utilizes the updated allowed list. The other approach is a static regional access control method performed when a UE updating an allowed list is different from a UE that utilizes the updated allowed list.

For example, a device that does not include a separate input/output unit for accessing a network may exist among UEs that perform M2M communication or machine type communication. Accordingly, the device may not be capable of accessing the access control update server 210 and may not be capable of updating an allowed list directly. The device may need a separate device to update the allowed list. In this example, the latter approach may be applicable.

The two static regional access control approaches are described in detail below.

A method according to a first embodiment of the present invention may correspond to the static regional access control approach performed when a UE updating an allowed list is identical to a UE that utilizes the updated allowed list.

Figure 3:
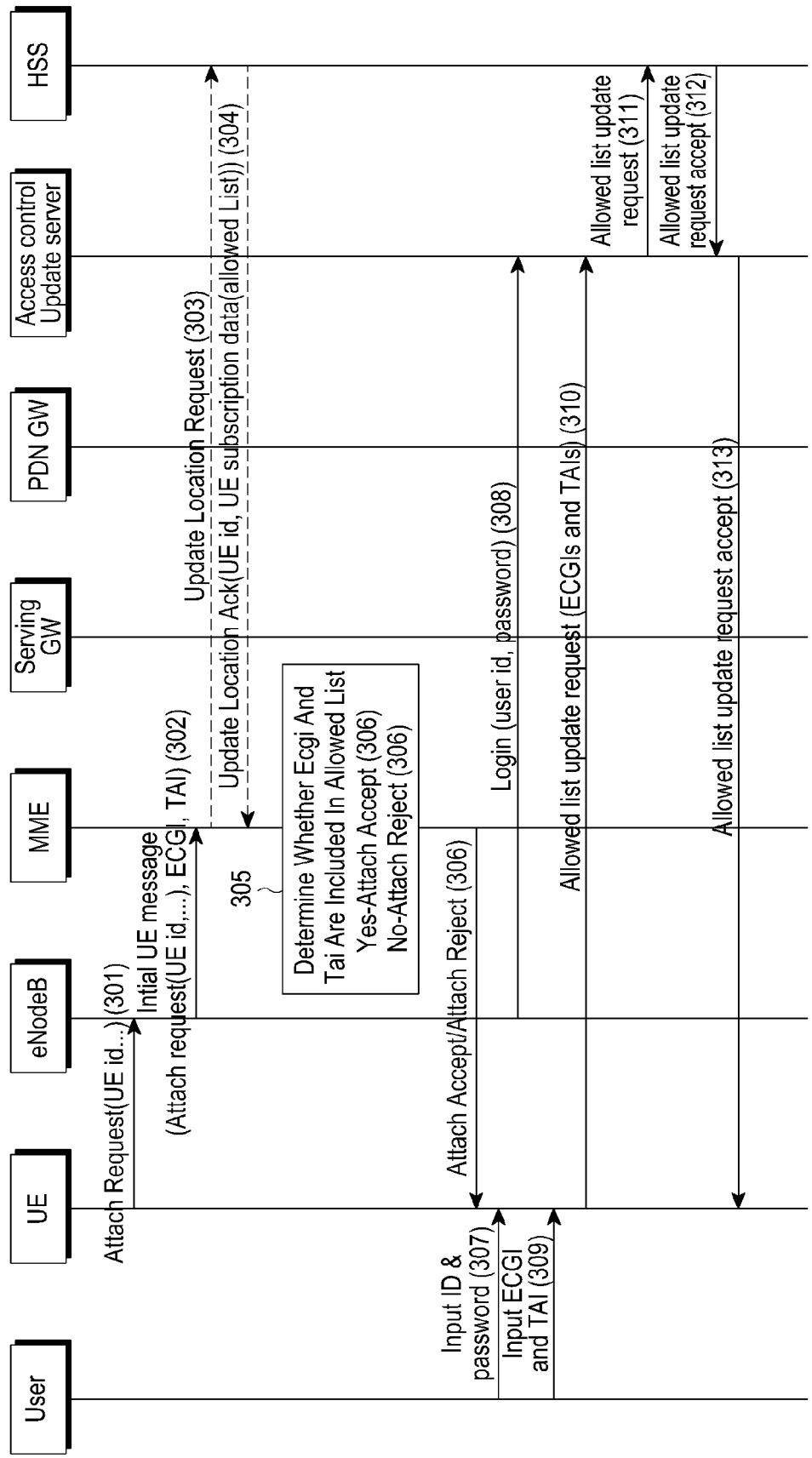
FIG. 3 is a diagram illustrating a signaling flow to perform static regional access control, according to an embodiment of the present invention.

FIG. 3 is a diagram illustrating a signaling flow to perform static regional access control, according to an embodiment of the present invention.

Referring to FIG. 3, a UE transmits, to an eNB, an Attach Request message that includes a UE IDentity (UE ID) and the like, in step 301. The UE ID may be embodied as an International Mobile Station Identity (IMSI) when the UE accesses the network for the first time, and may be embodied as an SAE-Temporary Mobile Subscriber Identity (S-TMSI) when the UE has previously accessed the network.

In step 302, the eNB transfers, to an MME, an ECGI and a TAI corresponding to location information of the UE, along with an initial UE message including the Attach Request message.

The MME determines whether the MME includes context information associated with the UE after receiving the Attach Request message. When the MME includes the context information associated with the UE, the signaling flow proceeds to step 305. When the MME does not include the context information associated with the UE, the signaling flow proceeds to step 303.

In step 303, since the MME fails to include the context information associated with the UE, the MME registers a location of the UE in an HSS, and may transmit an Update Location Request message to the HSS so as to receive subscriber information of the UE. Subsequently, the HSS transmits, to the MME, an Update Location Ack message in response to the Update Location Request message, in step 304. The Update Location Ack message may include the UE ID and the subscriber information of the UE including an allowed list.

When the MME already includes the context information associated with the UE or step 304 is completed, the signaling flow proceeds to step 305. In step 305, the MME determines whether the ECGI and the TAI corresponding to the location information of the UE are included in the allowed list received from the HSS. In step 306, the MME transmits an Attach Accept message to the UE, when the ECGI and the TAI are included in the allowed list, and the MME transmits an Attach Reject message to the UE when the ECGI and the TAI are absent from the allowed list. Specifically, when the ECGI and the TAI corresponding to the location information are included in the allowed list, the UE may access a network.

When the UE moves to a desired region that is excluded from the allowed list, the UE may add location information associated with the desired region to the allowed list. A process in which a user accesses an access control update server so as to update the allowed list is described in detail below. Also, the updating process may be performed through application-level signaling as opposed to through system signaling.

In step 307, the user inputs an ID and a password through an input device of the UE so as to enable the UE to access the access control update server. In step 308, the UE accesses the access control update server and logs in. After logging in, the user inputs, through the UE, ECGI(s) and TAI(s) to be added to the allowed list.

When step 309 is completed, the UE transmits an allowed list update request message to the access control update server, so as to update the allowed list in step 310. The allowed list update request message includes the ECGI(s) and TAI(s) corresponding to location information to be added to the allowed list. When the access control update server accepts an allowed list update request, the signaling flow proceeds to step 311. In step 311, the access control update server transmits the allowed list update request message to the HSS. The HSS updates the allowed list by adding, to the allowed list, the ECGI(s) and TAI(s) included in the allowed list update request message. In this embodiment of the present invention, the HSS deletes old information to maintain a magnitude of the allowed list to be constant.

When the HSS completes updating the allowed list, the HSS transmits an allowed list update request accept message to the access control update server, in step 312. In step 313, when the allowed list update request accept message is received from the HSS, the access control update server may inform the UE of a result of updating the allowed list.

Through the operations described in the foregoing, the method according to an embodiment of the present invention simplifies mobility management for limited-mobility UEs among UEs that perform M2M communication or machine type communication and thus, reduces network management costs. However, a separate method for obtaining an ECGI and a TAI corresponding to location information of a UE, to be input by a user for updating an allowed list, may be required.

A method according to another embodiment of the present invention may correspond to the static regional access control approach performed when a UE, updating an allowed list, is different from a UE that utilizes the updated allowed list.

Figure 4:
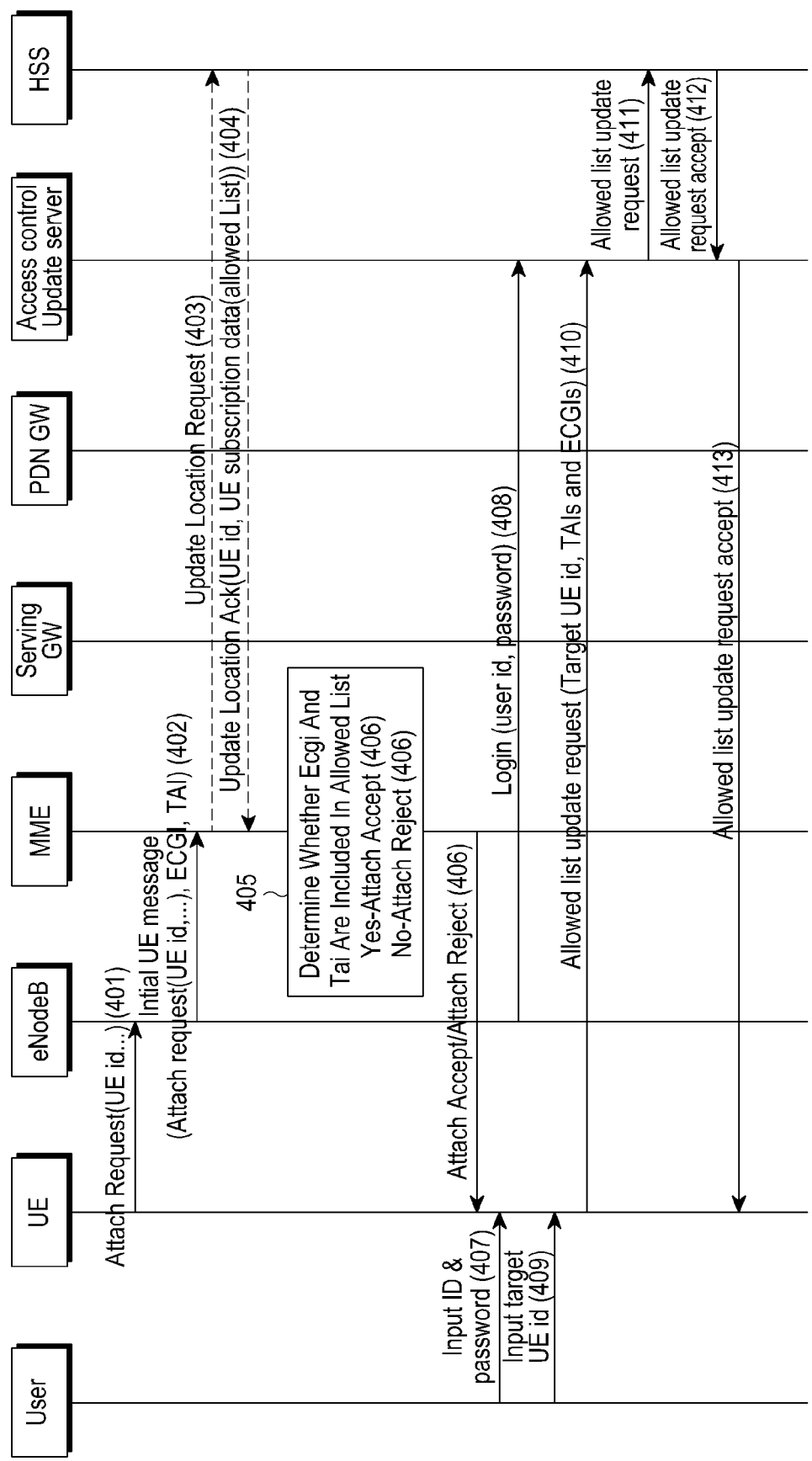
FIG. 4 is a diagram illustrating a signaling flow to perform static regional access control, according to an embodiment of the present invention.

FIG. 4 is a diagram illustrating a signaling flow to perform static regional access control, according to an embodiment of the present invention Referring to FIG. 4, steps 401 through 406, corresponding to a process in which a UE accesses a network, are substantially identical to steps 301 through 306, described above with respect to FIG. 3. Accordingly, a description of steps 401 through 406 is omitted. A process of accessing an access control update server so as to update an allowed list may be different from the method of FIG. 3, since a UE updating the allowed list is different from a UE utilizing the updated allowed list in the method of FIG. 4.

When the UE accesses the network through steps 401 through 406, a user inputs an ID and a password through an input device of the UE so as to enable the UE to access the access control update server, in step 407. In step 408, the UE accesses the access control update server and logs in. After logging in, the user inputs, to the UE, a target UE ID of a target UE of which an allowed list is to be updated.

The target UE corresponds to a UE that utilizes the updated allowed list. As described in the foregoing, the target UE is not equipped with an input/output device for accessing a network and thus, may not be capable of updating the allowed list. Accordingly, a UE that is capable of updating the allowed list in substitute for the target UE may be required. For example, the UE that is capable of updating the allowed list may be a UE that is provided by a communication provider and that is carried by an install engineer who can access a server When step 409 is completed, the UE transmits an allowed list update request message to the access control update server so as to update the allowed list in step 410. The allowed list update request message may include the target UE ID input by the user, and an ECGI and a TAI corresponding to a location of the UE that currently performs updating. The UE that performs updating is assumed to be located a short distance from the target UE.

When the access control update server accepts an allowed list update request, the signaling flow proceeds to step 411. In step 411, the access control update server transmits the allowed list update request message to the HSS. The HSS may update the allowed list through use of the target UE ID and the ECGI and the TAI included in the allowed list update request message. In this embodiment of the present invention, the HSS may delete old information so as to maintain a magnitude of the allowed list to be constant.

When the HSS completes updating the allowed list, the HSS may transmit an allowed list update request accept message to the access control update server, in step 412. When the allowed list update request accept message is received from the HSS, the access control update server informs the UE of a result of updating the allowed list.

Through the steps described with respect to FIG. 4, this embodiment of the present invention simplifies mobility management for immobile UEs among UEs that perform M2M communication or machine type communication and thus, reduces network management costs. However, the method may be inconvenient, since a user needs a separate UE to update an allowed list of a target UE.

In the foregoing descriptions, the static regional access control method has been described. The static regional access control method may be used when an allowed list is statically fixed as subscriber information of an HSS. However, the method may be inconvenient for a user when the user moves to a different region and UEs, which had been utilized in a home, are operated in the different region or the like, or when a vending machine or the like are moved to a different place. Specifically, to enable the moved UEs to access a network, the allowed list may need to be updated manually before changing its location. Accordingly, there is also a need for a regional access control method that automatically or dynamically updates an allowed list when a UE, which performs M2M communication or machine type communication, moves to a new region, so that the UE accesses a network.

Figure 5:
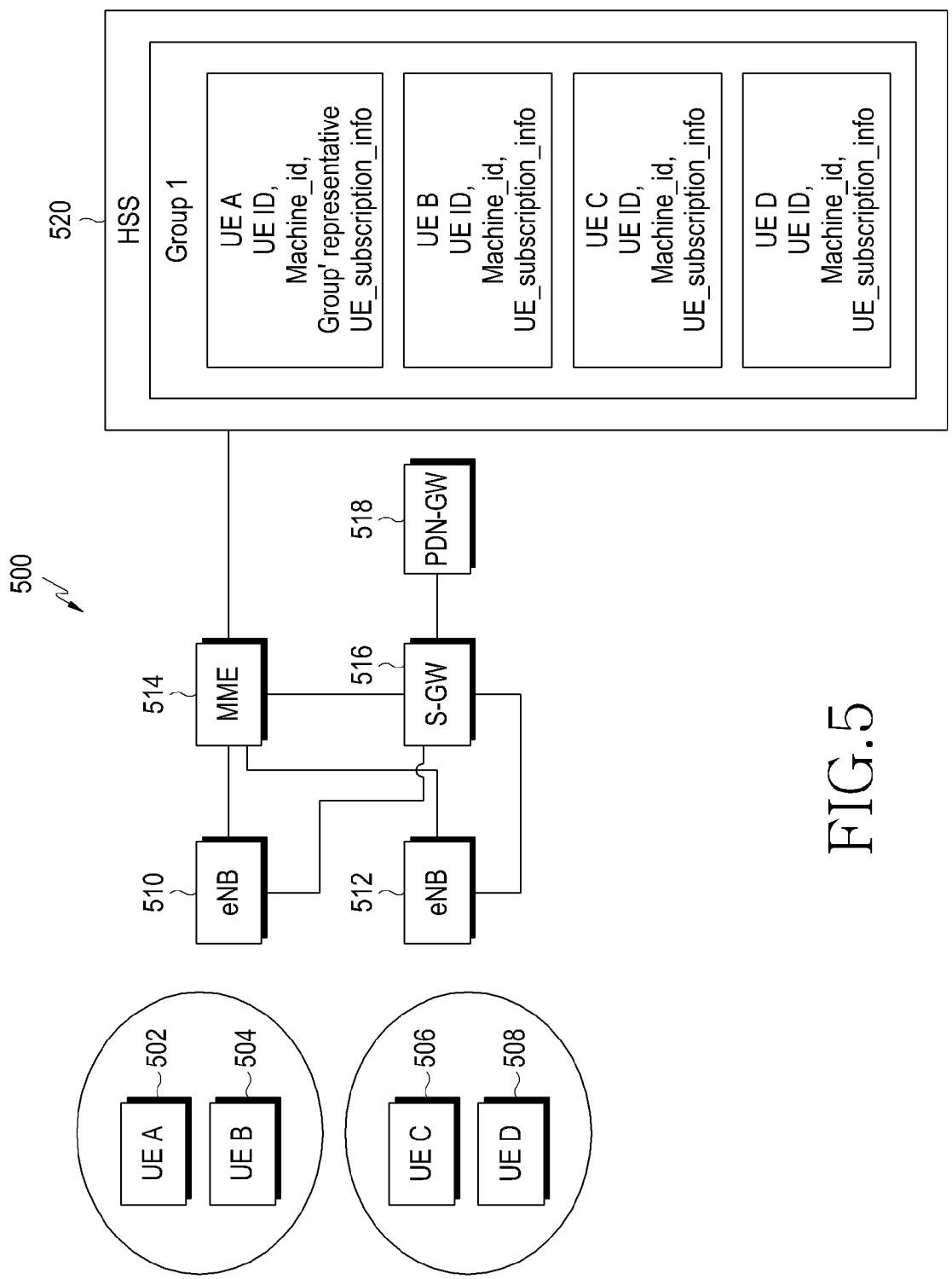
FIG. 5 is a diagram illustrating a configuration of a system that performs dynamic regional access control, according to an embodiment of the present invention.

FIG. 5 is a diagram illustrating a configuration of a system 500 that performs dynamic regional access control, according to an embodiment of the present invention Referring to FIG. 5, the system 500 includes UEs 502, 504, 506, and 508, eNBs 510 and 512, an MME 514, an S-GW 516, a PDN-GW 518, and an HSS 520. A description of remaining elements included in the system 500, which are not associated with embodiments of the present invention, is omitted.

The HSS 520 groups the predetermined UEs 502, 504, 506, and 508 into a group, and designates a representative UE for the group. In an embodiment of the present embodiment, UE A through UE D are grouped into group 1, and UE A is designated as a representative UE for group 1. Here, UEs included in a group may not need to exist in the same cell, and the UEs may be located away from each other.

A process in which the representative UE accesses a network based on an allowed list is substantially identical to an access process performed in operations 301 through 306 of FIG. 3.

A non-representative UE may access a network based on an allowed list, and may determine whether a representative UE exists in a region where the non-representative UE currently exists when the non-representative UE fails to access the network. When the representative UE exists, the non-representative UE may be allowed to access the network and the allowed list stored in the HSS may be updated to include a current location of the non-representative UE.

Hereinafter, a dynamic regional access control method for a non-representative UE in an access process (Attach process) using an allowed list will be described in detail with reference to FIG. 6.

Figure 6:
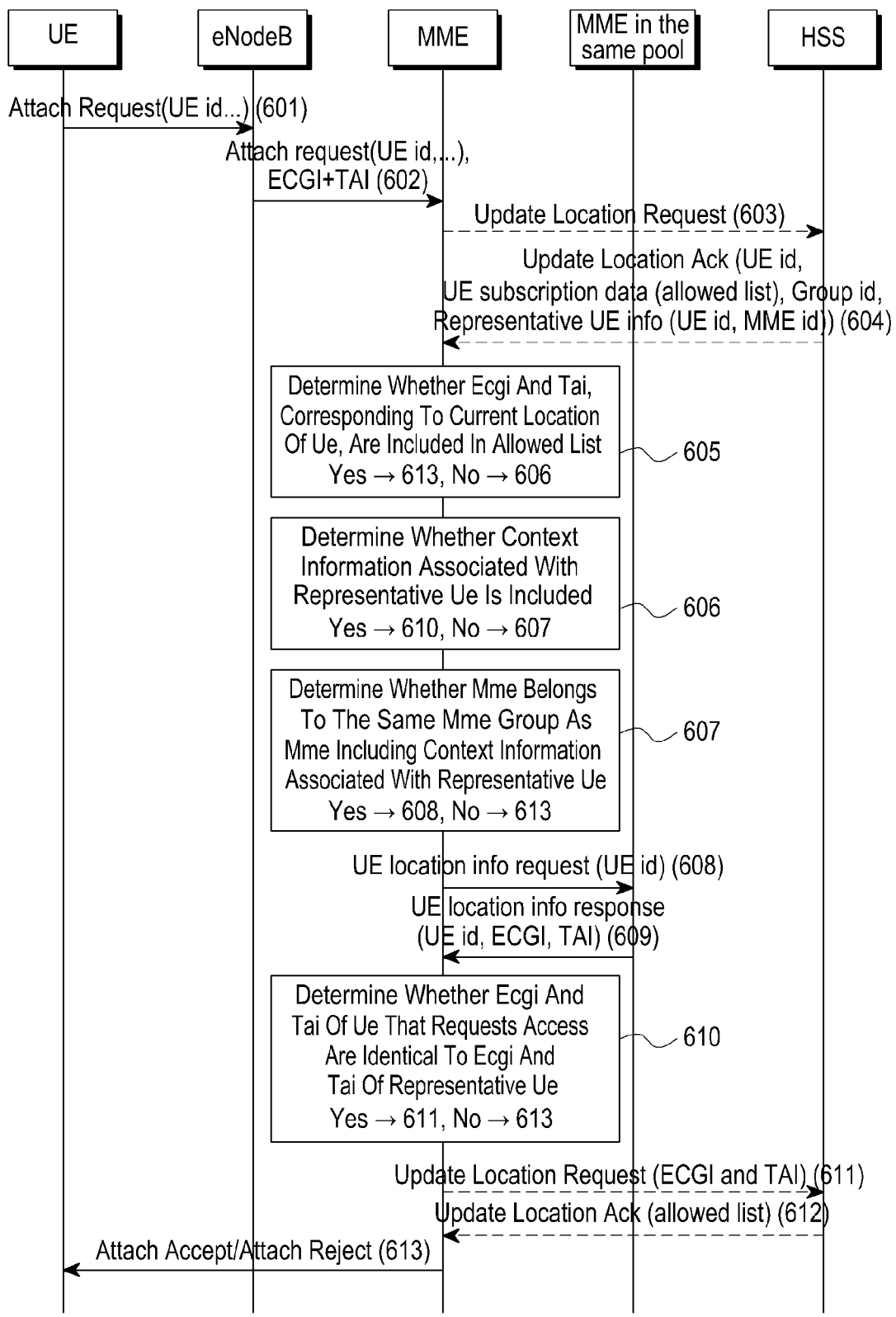
FIG. 6 is a diagram illustrating a signaling flow to perform dynamic regional access control for a non-representative UE, according to an embodiment of the present invention.

FIG. 6 is a diagram illustrating a signaling flow to perform dynamic regional access control for a non-representative UE, according to an embodiment of the present invention Referring to FIG. 6, a non-representative UE, hereinafter referred to as a UE, transmits, to an eNB, an Attach Request message including a UE ID and the like, in step 601.

In step 602, the eNB transfers, to an MME, an ECGI and a TAI corresponding to a location of the UE together with the Attach Request message received from the UE.

The MME determines whether the MME includes context information associated with the UE after receiving the Attach Request message. When the context information associated with the UE exists in the MME, the signaling flow proceeds to step 605. When the context information associated with the UE does not exist in the MME, the signaling flow proceeds to step 603.

In step 603, the MME registers the location of the UE, and transmits an Update Location Request message to an HSS so as to receive information associated with the UE and information associated with a representative UE. In step 604, the HSS transmits an Update Location Ack message to the MME in response to the Update Location Request message. The Update Location Ack message may include subscriber information of the UE including an allowed list, an ID (group ID) of a group to which the UE belongs, an ID (representative UE ID) of a representative UE of the group, and an ID (MME ID) of an MME that includes context information associated with the representative UE.

When the context information associated with the UE is absent in the MME or step 604 is completed, the MME determines whether the ECGI and the TAI corresponding to the location of the UE are included in the allowed list received from the HSS, in step 605. When the ECGI or the TAI is included in the allowed list, the signaling flow proceeds to step 613 so as to transmit an Attach Accept message to the UE. When the ECGI or the TAI is absent in the allowed list, the signaling flow proceeds to step 606 to perform network access through the use of the representative UE.

In step 606, the MME determines whether the MME includes the context information associated with the representative UE, based on the information associated with the representative UE received from the HSS. When the context information associated with the representative UE is included in the MME, the signaling flow proceeds to step 610. When the context information associated with the representative UE is not included in the MME, the signaling flow proceeds to step 607.

In step 607, since the MME fails to include the context information associated with the representative UE, the MME determines whether the MME belongs to the same MME group as the MME including the context information associated with the representative UE, based on the MME ID of the representative ID. When the MME belongs to the same MME group as the MME including the context information associated with the representative UE, the signaling flow proceeds to step 608. When the MMEs belong to different MME groups, the signaling flow proceeds to step 613 so as to transmit an Attach Reject message to the UE.

In step 608, the MME transmits a UE location information request message to the MME including the context information associated with the representative UE among MMEs in the MME group, so as to obtain an ECGI and a TAI corresponding to a location of the representative UE. In step 609, the MME including the context information associated with the representative UE may transmit, to the MME, a UE location information response message in response to the UE location information request message. The UE location information response message may include the ECGI and the TAI corresponding to the location of the representative UE.

When the determination in step 606 determines that the MME includes the context information associated with the representative UE, or when the ECGI and the TAI corresponding to the location of the representative UE are obtained through step 608, signaling flow proceeds to step 610.

In step 610, the MME determines whether the ECGI and the TAI corresponding to the location of the representative UE are identical to the ECGI and the TAI corresponding to the location of the UE that requests network access. When the ECGI and the TAI corresponding to the location of the representative UE are identical to the ECGI and the TAI corresponding to the location of the UE that requests network access, the signaling flow proceeds to step 611. However, when the ECGI and the TAI corresponding to the location of the representative UE are different from the ECGI and the TAI corresponding to the location of the UE that requests network access, the signaling flow proceeds to step 613, so as to transmit an Attach Reject message to the UE. The fact that the ECGI and the TAI corresponding to the location of the representative UE are identical to the ECGI and the TAI corresponding to the location of the UE that requests network access, indicates that the representative UE exists in the current location of the UE.

In step 611, the MME transmits, to the HSS, an Update Location Request message including the ECGI and the TAI, so as to update the allowed list. The HSS may update the allowed list to include the current location of the UE, through use of the Update Location Request message. In this embodiment of the present invention, the HSS may delete old information so as to maintain a magnitude of the allowed list to be constant. Subsequently, the HSS transmits the updated allowed list to the MME, in step 612.

In step 613, the MME transmits an Attach Accept message to the UE when the ECGI and the TAI associated with the UE are included in the updated allowed list, and the MME transmits an Attach Reject message to the UE when the ECGI and the TAI associated with the UE are absent in the updated allowed list.

Through the operations described in the embodiment above, a non-representative UE may access a network when a representative UE exists near the non-representative UE even though location information of the non-representative UE is absent in an allowed list. Also, the non-representative UE may automatically update the allowed list to include its current location information, through use of location information associated with the representative UE. Specifically, the method according to an embodiment of the present invention illustrated in FIG. 6 provides the dynamic regional access control method that uses the concepts of a representative UE and a group, so that a user may not need to manually update the allowed list.

The dynamic regional access control method simplifies the mobility management for limited-mobility UEs among UEs that perform M2M communication or machine type communication and thus, may reduces network management costs. Also, the dynamic regional access control method controls network access based on a region and thus, prevents a lost UE, which is used only in a predetermined place, for example a home appliance or a surveillance camera, from being utilized by a non-owner.

The dynamic regional access control method may be applicable when the non-representative UE is turned off and moves to a new region, and then is turned on in a region where the representative UE exists. Also, when a UE is operated by a battery and has a mobility from among the UEs that perform M2M communication and machine type communication, the UE may perform a Tracking Area Update (TAU) while the UE moves to a new region. In this embodiment of the present invention, a non-representative UE that belongs to a group may perform a dynamic regional access control method through use of a representative UE, during a TAU process. Hereinafter, the dynamic regional access control method for the non-representative UE during the TAU process using the allowed list will be described in detail with reference to FIG. 7.

Figure 7:
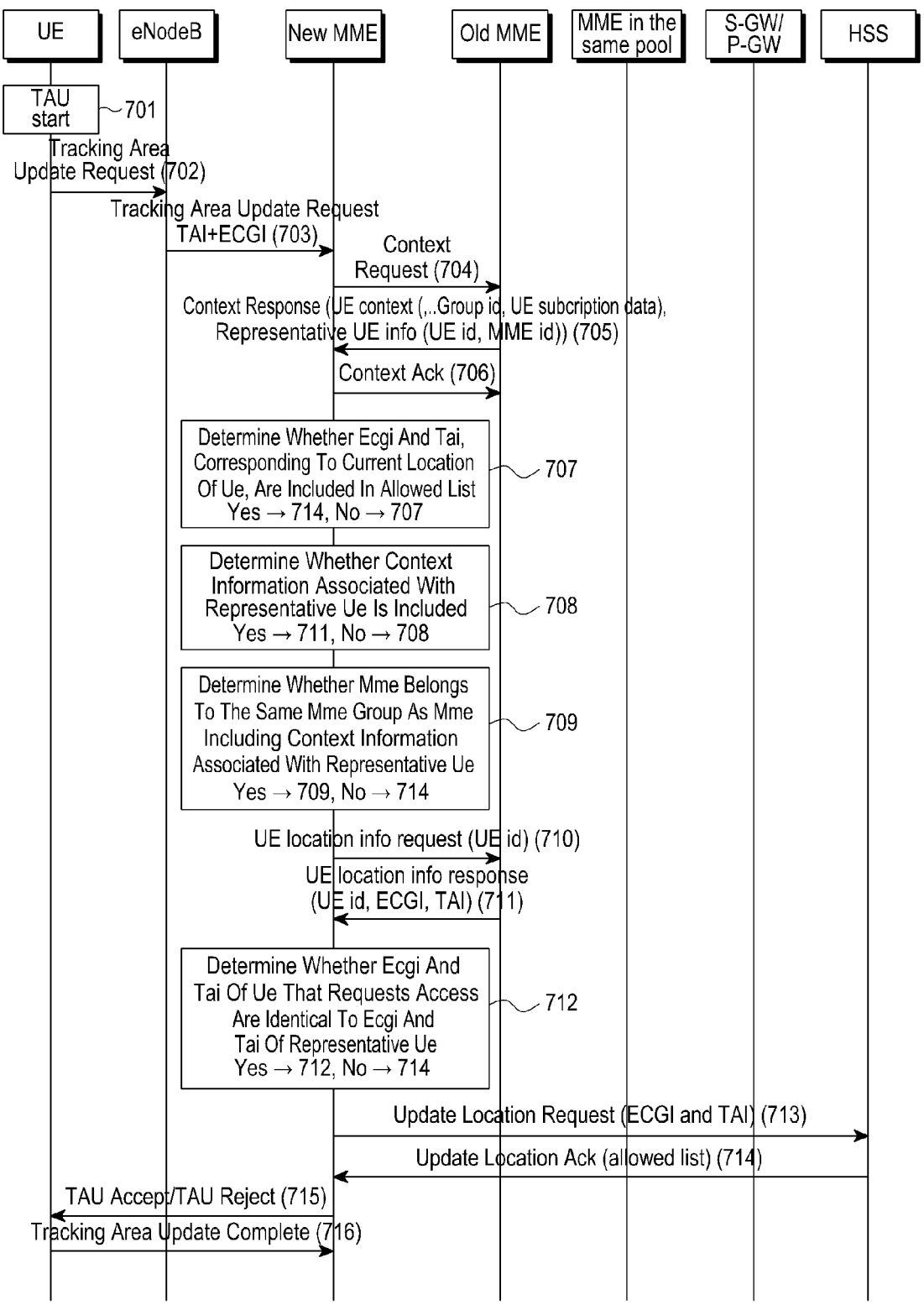
FIG. 7 is a diagram illustrating a signaling flow to perform dynamic regional access control for a non-representative UE, an embodiment of the present invention.

FIG. 7 is a diagram illustrating a signaling flow to perform dynamic regional access control for a non-representative UE, according to an embodiment of the present invention.

Referring to FIG. 7, a TAU process starts when a non-representative UE, hereinafter referred to as a UE, moves to a new region, in step 701. In step 702, the UE transmits a Tracking Area Update Request message to an eNB.

In step 703, the eNB transfers, to a new MME, an ECGI and a TAI corresponding to a location of the UE along with the Tracking Area Update Request message received from the UE.

The new MME determines whether the new MME includes context information associated with the UE that requests TAU. When the context information associated with the UE is absent in the new MME, the signaling flow proceeds to step 704, so as to request a previous MME to transmit the context information associated with the UE. Conversely, when the context information associated with the UE exists, the signaling flow proceeds to step 707.

When the new MME transmits a Context Request message to the previous MME in step 704, the previous MME transmits a Context Response message to the new MME in response to the Context Request message, in step 705. The Context Response message includes subscriber information of the UE, including an allowed list, an ID (group ID) of a group to which the UE belongs, an ID (representative UE ID) of a representative UE of the group, and an ID (MME ID) of an MME that includes context information associated with the representative UE. In step 706, the new MME may transmit a Context Ack message to the previous MME when the Context response message is received.

When the new MME includes the context information associated with the UE or the new MME obtains the context information associated with the UE through step 705, the signaling flow proceeds to step 707.

In step 707, the new MME determines whether the ECGI and the TAI corresponding to the location of the UE are included in the allowed list in the context information associated with the UE. When the ECGI and the TAI are included in the allowed list, the signaling flow proceeds to step 715 so as to transmit an Attach Accept message to the UE. Otherwise, the signaling flow proceeds to step 708.

Since the ECGI and the TAI, corresponding to the location of the UE that requests TAU, are absent in the allowed list, the new MME determines whether the new MME includes the context information associated with the representative UE based on the context information associated with the UE. When the new MME includes the context information associated with the representative UE, the signaling flow proceeds to step 712. When the new MME does not include the context information associated with the representative UE, the signaling flow proceeds to step 709.

In step 709, since the context information associated with the representative UE is absent in the new MME, the new MME determines whether the new MME belongs to the same MME group as the MME including the context information associated with the representative UE, through use of the MME ID included in information associated with the representative UE. When the new MME belongs to the same MME group as the MME including the context information associated with the representative UE, the signaling flow proceeds to step 709. Otherwise, the signaling flow proceeds to step 714 so as to transmit a TAU Reject message to the UE.

In step 710, the new MME transmits a UE location information request message to the MME including the context information associated with the representative UE among MMEs in the MME group, so as to obtain an ECGI and a TAI corresponding to a location of the representative UE. In step 711, the MME, including the context information associated with the representative UE, transmits, to the new MME, a UE location information response message in response to the UE location information request message. The UE location information response message may include the ECGI and the TAI corresponding to the location of the representative UE.

When the new MME includes the context information associated with the representative UE or the ECGI and the TAI corresponding to the location of the representative UE are obtained through step 710, the signaling flow proceeds to step 712. In step 712, the new MME determines whether the ECGI and the TAI corresponding to the location of the representative UE are identical to the ECGI and the TAI corresponding to the location of the UE that requests TAU.

When the ECGI and the TAI corresponding to the location of the representative UE are identical to the ECGI and the TAI corresponding to the location of the UE that requests TAU, the signaling flow proceeds to step 713 so as to update the allowed list. However, when the ECGI and the TAI corresponding to the location of the representative UE are different from the ECGI and the TAI corresponding to the location of the UE that requests TAU, the signaling flow proceeds to step 715 so as to transmit a TAU Reject message to the UE. The fact that the ECGI and the TAI corresponding to the location of the representative UE are identical to the ECGI and the TAI corresponding to the location of the UE that requests network access indicates that the representative UE exists in the current location of the UE.

In step 713, the new MME may transmit, to an HSS, an Update Location Request message including the ECGI and the TAI, so as to update the allowed list. The HSS may update the allowed list to include current location information of the UE through use of the Update Location Request message. In this embodiment of the present invention, the HSS may delete old information so as to maintain a magnitude of the allowed list to be constant. In step 713, the HSS transmits the updated allowed list to the MME.

In step 715, the new MME transmits a TAU Accept message to the UE when the ECGI and the TAI of the UE are included in the updated allowed list. Otherwise, the new MME transmit a TAU Reject message to the UE. In step 716, the UE transmits a Tracking Area Update Complete message to the new MME so as to complete the TAU process, in response to the TAU Accept message or the TAU reject message.

Through the operation described in FIG. 7, a non-representative UE may perform a TAU process when a representative UE exists near the non-representative UE even though location information of the non-representative UE is absent in an allowed list. Also, the non-representative UE may automatically update the allowed list to include its current location information, through use of information associated with the representative UE. Specifically, the method according to the embodiment illustrated in FIG. 7 may provide the dynamic regional access control method that uses the concepts of a representative UE and a group, so that a user may not need to manually update the allowed list.

The dynamic regional access control method simplifies the mobility management for immobile UEs among UEs that perform M2M communication or machine type communication and thus, reduces network management costs. Also, the dynamic regional access control method controls network access based on a region and thus, prevents a lost UE, which is used only in a predetermined place, for example a home appliance or a surveillance camera, from being utilized by a non-owner.

While the invention has been shown and described with reference to certain embodiments thereof, it will be understood by those skilled in the art that various changes in form and detail be made therein without departing from the spirit and scope of the invention as defined by the appended claims.

What is claimed is:

1. A regional access control method in a Mobility Management Entity (MME) for network access for a User Equipment (UE) that performs Machine-to-Machine (M2M) communication, the method comprising the steps of:
   receiving, from a base station, an access request message and location information of the UE in response to reception of the access request message transmitted from the UE;
   registering, in a Home Subscriber Server (HSS), a location of the UE that is determined based on the location information of the UE;
   obtaining, from the HSS, an allowed list of regions to which the UE is allowed to move from the HSS;
   determining whether the location information of the UE is registered in the allowed list; and transmitting an access-allow message to the UE when the location information of the UE is included in the allowed list.

2. The method of claim 1, wherein the location information of the UE comprises at least one of an Enhanced Universal Terrestrial Radio Access Network (E-UTRAN) Cell Global Identity, (ECGI) and a Tracking Area Identity (TAI).

3. The method of claim 1, further comprising:
and
transmitting an access-reject message to the UE when the location information of the UE is absent from the allowed list.

4. The method of claim 1, wherein the allowed list comprises at least one of an ECGI list and a TAI list.

5. A regional access control method in a Mobility Management Entity (MME) for network access for a User equipment (UE) that performs Machine-to-Machine (M2M) communication, the method comprising the steps of:
receiving, from a base station, an access request message and location information of the UE in response to reception of the access request message transmitted from the UE;
registering, in a Home Subscriber Server (HSS), a location of the UE that is determined based on the location information of the UE;
obtaining, from the HSS, an allowed list of regions to which the UE is allowed to move and information associated with a representative UE;
determining whether the location information of the UE is registered in the allowed list;
and updating the allowed list stored in the HSS based on the information associated with the representative UE when the location information of the UE is absent from the allowed list, and transmitting an access-allow message to the UE when the location information of the UE is included in the allowed list.

6. The method of claim 5, wherein the UE belongs to a same group as the representative UE.

7. The method of claim 5, wherein the location information of the UE comprises at least one of an Enhanced Universal Terrestrial Radio Access Network (E-UTRAN) Cell Global Identity (ECGI) and a Tracking Area Identity (TAI).

8. The method of claim 5, wherein tile allowed list comprises at least one of an ECGI list and a TAI list.

9. The method of claim 5, wherein the information associated with the representative UE comprises an IDentity (ID) of the representative UE and an ID of an MME that includes context information associated with the representative UE.

10. The method of claim 5, further comprising:
transmitting an access-allow message to the UE when the location information of the UE is included in the allowed list.

11. The method of claim 5, further comprising:
determining whether context information associated with the representative UE is included in the MME when the location information of the UE is absent from the allowed list.

12. The method of claim 11, wherein, when the context information associated with the representative UE is included in the MME, further comprising:
determining whether the location information of the UE is identical to location information of the representative UE, and updating the allowed list stored in the HSS when the location information of the UE is identical to the location information of the representative UE.

13. The method of claim 11, wherein, when the context information associated with the representative UE is absent from the MME, further comprising:
determining whether the MME belongs to a same group as an MME including the context information associated with the representative UE, and obtaining location information of the representative UE from the MME including the context information when the MME and the MME including the context information belong to the same group.

14. The method of claim 13, further comprising: determining whether the location information of the UE is identical to the location information of the representative UE, and updating the allowed list stored in the HSS when the location information of the UE is identical to the location information of the representative UE.

15. The method of claim 5, further comprising:
and
transmitting an access-reject message to the UE when the location information of the UE is absent from the updated allowed list.

16. A regional access control method in a Mobility Management Entity (MME) for Tracking Area Update (TAU) by a User Equipment (UE) that performs Machine-to-Machine (M2M) communication, the method comprising the steps of:
receiving, from a base station, an access request message and location information of the UE in response to reception of a TAU request message transmitted from the UE;
determining whether the location information of the UE is included in an allowed list of regions to which the UE is allowed to move; and updating the allowed list stored in a Home Subscriber Server (HSS) based on information associated with a representative I.JE when the location information of the UE is absent from the allowed list; and transmitting a TAU allow message to the UE when the location information of the UE is included in the updated allowed list.

17. The method of claim 16, wherein the UE belongs to a same group as the representative UE.

18. The method of claim 16, wherein the location information of the UE comprises at least one of an Enhanced Universal Terrestrial Radio Access Network (E-UTRAN) Cell Global Identity (ECGI) and a Tracking Area Identity ('FAI), and the allowed list comprises at least one of an ECGI list and a TAI list.

19. The method of claim 16, wherein the information associated with the representative UE comprises an IDentity (ID) of the representative UE and an II) of an MME including context information associated with the representative UE.

20. The method of claim 16, further comprising: obtaining context information associated with the UE from an MME managing a region where the UE was previously located, when the context information associated with the UE is absent from the MME.

21. The method of claim 16, further comprising: transmitting a TAI allow message to the UE when the location information of the UE is included in the allowed list.

22. The method of claim 16, further comprising:
determining whether context information associated with the representative UE is included in the MME when the location information of the UE is absent from the allowed list.

23. The method of claim 22, wherein, when the context information associated with the representative UE is included in the MME, further comprising:
determining whether the location information of the UE is identical to location information of the representative UE, and updating the allowed list stored in the HSS when the location information of the UE is identical to the location information of the representative UE.

24. The method of claim 22, wherein, when the context information associated with the representative UE is absent from the MME, further comprising:

determining whether the MME belongs to a same group as an MME including the context information associated with the representative UE, and obtaining location information of the representative UE from the MME including the context information when the MME and the MME including the context information belong to the same group.

25. The method of claim 24, further comprising: determining whether the location information of the UE is identical to the location information of the representative UE, and updating the allowed list stored in the HSS when the location information of the UI is identical to the location information of the representative UE.

26. The method of claim 16, further comprising:
and transmitting a TAU reject message to the UE when the location information of the UE is absent in the updated allowed list.

* * * * *